United States Patent
Zhang et al.

(10) Patent No.: US 11,753,071 B2
(45) Date of Patent: Sep. 12, 2023

(54) SYSTEMS AND METHODS FOR REAL-TIME MONITORING OF VEHICLE INERTIA PARAMETER VALUES USING LATERAL DYNAMICS

(71) Applicant: STEERING SOLUTIONS IP HOLDING CORPORATION, Saginaw, MI (US)

(72) Inventors: Xingye Zhang, Saginaw, MI (US); Apurv Naman, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 103 days.

(21) Appl. No.: 16/746,808

(22) Filed: Jan. 18, 2020

(65) Prior Publication Data
US 2021/0221432 A1    Jul. 22, 2021

(51) Int. Cl.
*B62D 6/04* (2006.01)
*B60W 40/114* (2012.01)
*B60W 40/109* (2012.01)
*G05D 1/00* (2006.01)

(52) U.S. Cl.
CPC ............. *B62D 6/04* (2013.01); *B60W 40/109* (2013.01); *B60W 40/114* (2013.01); *G05D 1/0088* (2013.01); *B60W 2520/125* (2013.01); *B60W 2520/14* (2013.01); *B60W 2530/10* (2013.01); *B60W 2710/20* (2013.01)

(58) Field of Classification Search
CPC .. B60W 40/12; B60W 40/109; B60W 40/114; B60W 2520/125; B60W 2520/14; B60W 2530/10; B60W 2710/20; G05D 1/0088; B62D 6/04
See application file for complete search history.

(56) References Cited

U.S. PATENT DOCUMENTS

| | | | |
|---|---|---|---|
| 7,273,127 B2 * | 9/2007 | Pick | B62D 6/005 180/446 |
| 7,877,200 B2 * | 1/2011 | Lu | B60T 8/24 701/124 |
| 2006/0276944 A1 * | 12/2006 | Yasui | B60T 8/1755 701/37 |
| 2016/0297411 A1 * | 10/2016 | Trombley | B60T 7/20 |
| 2016/0364990 A1 * | 12/2016 | Khaghani | G05D 1/0088 |
| 2018/0015948 A1 | 1/2018 | Varunjikar et al. | |

(Continued)

FOREIGN PATENT DOCUMENTS

DE    102010062549 A1 *    6/2012    ........... G01G 19/086

*Primary Examiner* — Jeff A Burke
*Assistant Examiner* — Jerrod Irvin Davis
(74) *Attorney, Agent, or Firm* — Dickinson Wright PLLC (57) ABSTRACT

A method for monitoring vehicle inertia parameters in real-time includes receiving at least one lateral dynamic value. The method also includes calculating at least one vehicle inertia parameter value using the at least one lateral dynamic value. The method also include determining a difference between the calculated at least one vehicle inertia parameter value and a corresponding baseline vehicle inertia parameter value. The method also includes, based on a comparison between the difference between the calculated at least one vehicle inertia parameter value and the corresponding baseline vehicle inertia parameter value and a threshold, selectively controlling at least one vehicle operation based on the calculated at least one vehicle inertia parameter value.

20 Claims, 4 Drawing Sheets

(56) References Cited

U.S. PATENT DOCUMENTS

| | | | |
|---|---|---|---|
| 2018/0087905 A1* | 3/2018 | Chekanov | G01C 21/16 |
| 2018/0106714 A1* | 4/2018 | Skold | G01N 19/02 |
| 2019/0143970 A1* | 5/2019 | Chen | G01C 9/00 |
| | | | 701/93 |
| 2019/0250609 A1* | 8/2019 | Luo | G05D 1/0088 |
| 2019/0317516 A1* | 10/2019 | Zhu | G05D 1/0223 |
| 2020/0232842 A1* | 7/2020 | Huang | B60W 40/13 |
| 2020/0269854 A1* | 8/2020 | Wei | B60W 40/13 |
| 2021/0070260 A1* | 3/2021 | Zula | B60Q 9/00 |
| 2021/0094556 A1* | 4/2021 | Jordan | B60W 50/045 |

* cited by examiner

FIG. 4

SYSTEMS AND METHODS FOR REAL-TIME MONITORING OF VEHICLE INERTIA PARAMETER VALUES USING LATERAL DYNAMICS

TECHNICAL FIELD

This disclosure relates to monitoring vehicle inertia parameter values and in particular, to systems and methods for real-time monitoring of vehicle inertia parameter values using lateral dynamics.

BACKGROUND

Dynamic behavior of vehicles, such as cars, trucks, sport utility vehicles, crossovers, mini-vans, or other suitable vehicles, during operation is typically affected by both vehicle geometric parameters (e.g., length, width, and height) and inertia parameters (e.g., mass, center of gravity location along a longitudinal axis, and yaw moment of inertia). Under most operating conditions, geometric parameters are constant and may be monitored via an image capturing device, such as a camera. However, inertia parameter values may change over time (e.g., during vehicle operation), especially for large vehicles (e.g., large trucks).

Typically, in order to control operation of a vehicle, it is important for an operator of the vehicle or an autonomous control system of the vehicle to understand vehicle behavior (e.g., including vehicle geometric parameters and vehicle inertia parameters). For example, the vehicle geometric parameters and vehicle inertia parameters may affect steering control and may affect a haptic feedback to the operator of the vehicle. Additionally, or alternatively, for advanced driver-assistance systems or autonomous control systems, an associated controller operates as a virtual operator of the vehicle to control the vehicle. Such a virtual operator typically needs to understand the vehicle geometric parameters, the vehicle inertia parameters, and an environment proximate to the vehicle in order to control operation of the vehicle. Accordingly, an accurate vehicle model (e.g., using vehicle geometric parameters, vehicle inertia parameters, and/or other suitable vehicle parameters) is important for accurate vehicle control.

SUMMARY

This disclosure relates generally to monitoring vehicle inertia parameter values.

An aspect of the disclosed embodiments includes a system for monitoring vehicle inertia parameters in real-time. The system includes a processor and a memory. The memory includes instructions that, when executed by the processor, cause the processor to: receive at least one lateral dynamic value; calculate at least one vehicle inertia parameter value using the at least one lateral dynamic value; determine a difference between the calculated at least one vehicle inertia parameter value and a corresponding baseline vehicle inertia parameter value; and based on a comparison between the difference between the calculated at least one vehicle inertia parameter value and the corresponding baseline vehicle inertia parameter value and a threshold, selectively control at least one vehicle operation based on the calculated at least one vehicle inertia parameter value.

Another aspect of the disclosed embodiments includes a method for monitoring vehicle inertia parameters in real-time. The method includes receiving at least one lateral dynamic value. The method also includes calculating at least one vehicle inertia parameter value using the at least one lateral dynamic value. The method also include determining a difference between the calculated at least one vehicle inertia parameter value and a corresponding baseline vehicle inertia parameter value. The method also includes, based on comparison between the difference between the calculated at least one vehicle inertia parameter value and the corresponding baseline vehicle inertia parameter value and a threshold, selectively controlling at least one vehicle operation based on the calculated at least one vehicle inertia parameter value.

Another aspect of the disclosed embodiments includes an apparatus for monitoring vehicle inertia parameters. The apparatus includes a vehicle controller that includes a processor and a memory. The memory includes instructions that, when executed by the processor, cause the processor to: receive at least one lateral dynamic value; calculate a vehicle mass value using the at least one lateral dynamic value; calculate a location of a vehicle center of gravity along a longitudinal axis of the vehicle using the at least one lateral dynamic value; calculate a vehicle yaw moment of inertia value about a location of a center of gravity of the vehicle using the at least one lateral dynamic value; determine a first difference between the calculated vehicle mass value and a corresponding baseline vehicle mass value; determine a second difference between the calculated location of the vehicle center of gravity and a corresponding baseline location of the vehicle center of gravity; determine a third difference between the calculated vehicle yaw moment of inertia value and a corresponding baseline vehicle yaw moment of inertia value; and, based on a determination that at least one of the first difference, the second difference, and the third difference is within a range of a corresponding threshold, selectively control at least one vehicle operation based on one or more of the calculated vehicle mass value, the calculated location of the vehicle center of gravity, and the calculated vehicle yaw moment of inertia value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, dynamic behavior of vehicles, such as cars, trucks, sport utility vehicles, crossovers, mini-vans, or other suitable vehicles, during operation is typically affected by both vehicle geometric parameters (e.g., length, width, and height) and inertia parameters (e.g., mass, center of gravity location along a longitudinal axis, and yaw moment of inertia). Under most operating conditions, geometric parameters are constant and may be monitored via an image capturing device, such as a camera. However, inertia parameter values may change over time (e.g., during vehicle operation), especially for large vehicles (e.g., large trucks).

Typically, in order to control operation of a vehicle, it is important for an operator of the vehicle or an autonomous control system of the vehicle to understand vehicle behavior (e.g., including vehicle geometric parameters and vehicle inertia parameters). For example, the vehicle geometric parameters and vehicle inertia parameters may affect steering control and may affect a haptic feedback to the operator of the vehicle. Additionally, or alternatively, for advanced driver-assistance systems (ADAS) or autonomous control systems, an associated controller operates as a virtual operator of the vehicle to control the vehicle. Such a virtual operator typically needs to understand the vehicle geometric parameters, the vehicle inertia parameters, and an environment proximate to the vehicle in order to control vehicle operation.

An accurate vehicle model (e.g., using vehicle geometric parameters, vehicle inertia parameters, and/or other suitable vehicle parameters) is important for accurate vehicle control. In order to accurately represent the vehicle in the vehicle model, it may be important to monitor the inertia parameter values of the vehicle in the real-time (e.g., for operator controlled operation of the vehicle, ADAS controlled vehicle operation, and autonomous controlled vehicle operation). Typically, vehicle controllers may be configured to estimate vehicle payload on a front axle at relatively low vehicle speed. However, vehicle dynamic behavior may vary significantly for larger vehicles and/or vehicles traveling at relatively high speeds.

Accordingly, systems and methods, such as those described herein, configured to monitor vehicle inertia parameter values (e.g., mass, center of gravity location along longitudinal axis, and yaw moment of inertia) in real time using lateral dynamics (e.g., yaw rate and lateral acceleration) at high vehicle speed, may be desirable. In some embodiments, the systems and methods described herein may be configured to monitor vehicle inertia parameter values for various road surfaces. The systems and methods described herein may be configured to use signals from an electric power steering (EPS) system of the vehicle and from an inertia measurement unit (IMU).

In some embodiments, the systems and methods described herein may be configured to receive at least one lateral dynamic value. The systems and methods described herein may be configured to calculate at least one vehicle inertia parameter value using the at least one lateral dynamic value. The systems and methods described herein may be configured to determine a difference between the calculated at least one vehicle inertia parameter value and a corresponding baseline vehicle inertia parameter value. The systems and methods described herein may be configured to, based on a comparison between the difference between the calculated at least one vehicle inertia parameter value and the corresponding baseline vehicle inertia parameter value and a threshold, selectively control at least one vehicle operation based on the calculated at least one vehicle inertia parameter value.

In some embodiments, the systems and methods described herein may be configured to receive at least one lateral dynamic value. The systems and methods described herein may be configured to calculate a vehicle mass value using the at least one lateral dynamic value. The systems and methods described herein may be configured to calculate a location of a vehicle center of gravity along a longitudinal axis of the vehicle using the at least one lateral dynamic value. The systems and methods described herein may be configured to calculate a vehicle yaw moment of inertia value about a location of a center of gravity of the vehicle using the at least one lateral dynamic value. The systems and methods described herein may be configured to determine a first difference between the calculated vehicle mass value and a corresponding baseline vehicle mass value. The systems and methods described herein may be configured to determine a second difference between the calculated location of the vehicle center of gravity and a corresponding baseline location of the vehicle center of gravity. The systems and methods described herein may be configured to determine a third difference between the calculated vehicle yaw moment of inertia value and a corresponding baseline vehicle yaw moment of inertia value. The systems and methods described herein may be configured to, based on a determination that at least one of the first difference, the second difference, and the third difference is within a range of a corresponding threshold, selectively control at least one vehicle operation based on one or more of the calculated vehicle mass value, the calculated location of the vehicle center of gravity, and the calculated vehicle yaw moment of inertia value.

Figure 1:
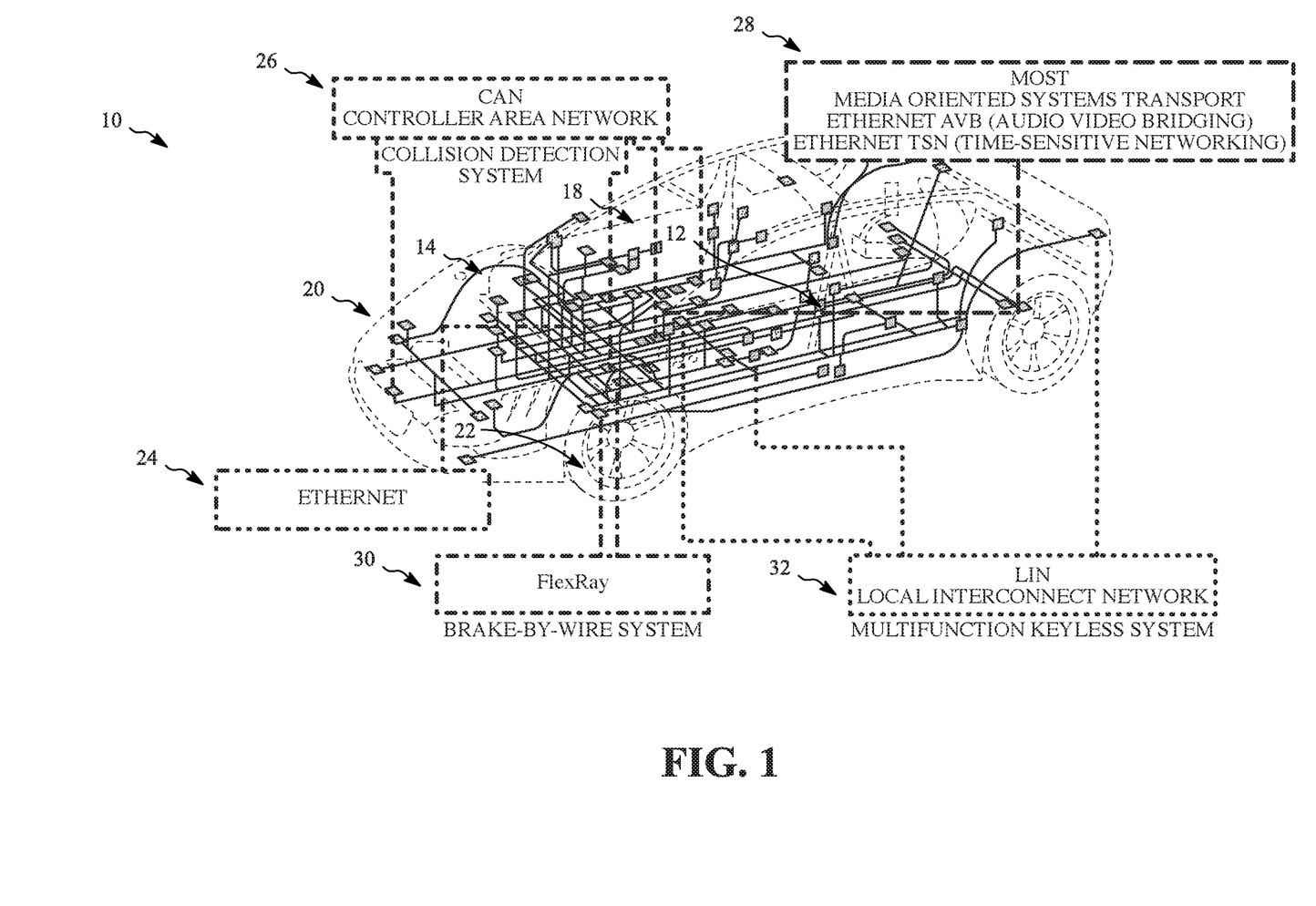
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network component (CAN) 26, a media oriented systems transport component (MOST) 28, a FlexRay component 30 (e.g., brake-by-wire system, and the like), and a local interconnect network component (LIN) 32. The vehicle 10 may use the CAN 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2:
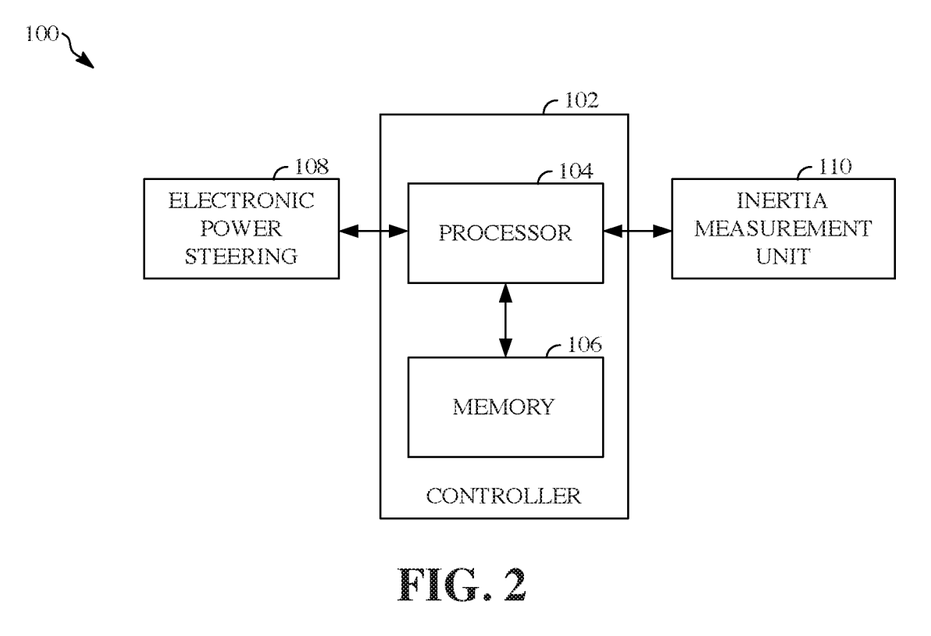
FIG. 2 generally illustrates a vehicle inertia monitoring system according to the principles of the present disclosure.

The vehicle 10 may include a vehicle inertia monitoring system 100, as is generally illustrated in FIG. 2. The system 100 may include a controller 102. The controller 102 may include an electronic control unit or other suitable vehicle controller. The controller 102 may include a processor 104 and memory 106 that includes instructions that, when executed by the processor 104, cause the processor 104 to, at least, monitor vehicle inertia parameter values of the vehicle 10. The processor 104 may include any suitable processor, such as those described herein. The memory 106 may comprise a single disk or a plurality of disks (e.g., hard drives), and includes a storage management module that manages one or more partitions within the memory 106. In some embodiments, memory 106 may include flash memory, semiconductor (solid state) memory or the like. The memory 106 may include Random Access Memory (RAM), a Read-Only Memory (ROM), or a combination thereof.

The system 100 may include an electronic power steering (EPS) system 108 configured to assist and/or control steering of the vehicle 10. The EPS system 108 may include or be in communication with various sensors configured to measure various aspects of the steering system of the vehicle 10. The EPS system 108 may include various controllers, memory, actuators, and/or other various components in addition to or alternatively to those described herein. The EPS system 108 may be configured to measure and communicate, to the controller 102 (e.g., to the processor 104) various lateral dynamic parameter values, as will be described. In some embodiments, the system 100 may omit the EPS system 108. For example, the system 100 may include or be in communication with a steer by wire system, the system 100 may include or be in communication with an autonomous steering system (e.g., no steering wheel or EPS system), or may include any other suitable system in addition to or instead of the EPS system 108.

The system 100 may include an inertia measurement unit (IMU) 110. The IMU 110 may include any suitable IMU and may include one or more measurement devices and/or sensors configured to measure various inertia characteristics and/or parameter values of the vehicle 10. The IMU 110 may be configured to measure and communicate, to the controller 102 (e.g., to the processor 104) various lateral dynamic parameter values, as will be described.

Figure 3:
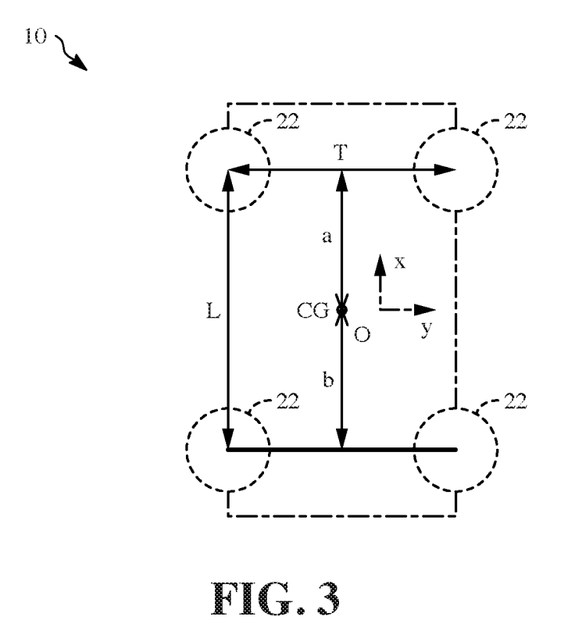
FIG. 3 generally illustrates a top view of a geometry of a four-wheel vehicle according to the principles of the present disclosure.

FIG. 3 generally illustrates a top view of a geometry of the vehicle 10 according to the principles of the present disclosure. While the vehicle 10 is illustrated as having four wheels, it should be understood that the principles of the present disclosure are applicable to any suitable vehicle having any suitable number of wheels. As is generally illustrated, x-y represents a vehicle body fixed frame of the vehicle 10 with x denoting a longitudinal axis and y denoting a lateral axis. L represents a wheelbase of the vehicle 10, which includes a distance between centers of front and rear wheels 22. T represents a track of the vehicle 10, which includes a distance between centers of left and right wheels 22. CG represent a center of gravity of the vehicle 10 and 0 represents a location of CG in the x-y frame.

As is generally illustrated, a represents a distance from the location of CG (e.g., location 0) to the front axle along x axis, and b represents a distance from the location of CG (e.g., location 0) to rear axle along x-axis. As described, the geometry of the vehicle 10 is considered static. M represents a vehicle mass of the vehicle 10 and $I_{zz}$ represents a yaw moment of inertia of the vehicle 10. As is generally illustrated, u represents a velocity of CG along x-axis and v represents a velocity of CG along y-axis. In some embodiments, $d_f$ represents a steering angle of front wheels 22 and dr represents a steering angle of rear wheels 22. The following equations represent a front steering system, where $d_r$ equals 0. However, it should be understood that the principles of the present disclosure may be applicable to any suitable steering system of the vehicle 10 or other suitable vehicle.

In some embodiments, at relatively high vehicle speeds of the vehicle 10, the steering angle is considered to be relatively small (e.g., which is a reasonable assumption most scenarios). The controller 102 (e.g., using the processor 104) may be configured to use a bicycle model or any other suitable model to represent the dynamic behavior of the vehicle 10 at relatively high vehicle speeds. In some embodiments, the controller 102 may be configured to calculate vehicle dynamic behavior parameter values, as is illustrated in Equation (1):

$$MC(\dot{v}+ur\gamma)=F_{yf}\cos(\delta_f)+F_{yr}$$

$$\dot{\gamma}I_{zz}=aF_{yf}\cos(\delta_f)+F_{yr}$$

Where, $F_{yf}$ is a lateral force on the front wheels 22 and $F_{yr}$ is a lateral force on the rear wheels 22. Equation (1) may be manipulated and represented as Equation (2), where $F_{yr}$ drops out of the equation:

$$M(\dot{v}+ur\gamma)b+\dot{\gamma}I_{zz}=LF_{yf}\cos(\delta_f)$$

The controller 102 may receive a yaw rate value from the IMU 110 and lateral acceleration value (e.g., of the ground fixed frame) from the IMU 110 and/or the EPS system 108. The controller 102 may be configured to calculate a derivative of yaw rate value with respect to time to determine a yaw acceleration value. The controller 102 may receive a column angle value from one or more sensors of the EPS system 108. The controller 102 may convert the column angle value to a steering angle value (e.g., an angle of one or more of the wheels 22) based on a mechanical ratio and tire relaxation value.

In some embodiments, the controller 102 may be configured to determine a lateral force acting on a front wheel 22 by analyzing a relationship between the lateral force and a rack force as is illustrated in Equation (3):

Where $T_m$ is a mechanical trail, $T_p$ is a pneumatic trail, $F_R$ is the rack force, and $A_S$ is a steering arm. For the vehicle 10, the mechanical trail and the steering arm are constant. The pneumatic trail is a function of vehicle speed of the vehicle 10 and a slip angle (e.g., because steering angle is assumed to be relatively small, the slip angle is assumed to be relatively small, such that the pneumatic trial is a function of vehicle speed only). The controller 102 may be configured to estimate the rack force using one or more measurements received from the EPS system 108. The controller 102 may be configured to estimate the lateral force on at least one of the front wheels 22, using on Equation (3) and defining:

$$A=\dot{v}+ur\gamma \; B=\dot{\gamma} \; C=LF_{yf}\cos(\delta_f)$$

Thus, Equation (2) may be represented as Equation (4):

$$AMb+BI_{zz}=C$$

And at time k represented as:

$$A_k Mb+B_k I_{zz}=C_k$$

Where A, B, and C are known values and M, b, $I_{zz}$ are unknown variables. The controller 102 may receive a value representing A from the IMU 110. The controller 102 may calculate B using the yaw rate value received from the IMU 110. The controller 102 may calculate C using various measurements (e.g., communicated as signals) from the EPS system 108. The measurements may include a pinion angle and an estimated rack force. The controller 102 may calculate C using the measurements and Equation (3).

In some embodiments, the controller 102 may determine M, b, and $I_{zz}$ by calculating the following equation at multiple time steps:

$$\begin{bmatrix} Mb \\ I_{zz} \end{bmatrix} = \begin{bmatrix} A_k & B_k \\ A_{k+1} & B_{k+1} \end{bmatrix}^{-1} \begin{bmatrix} C_k \\ C_{k+1} \end{bmatrix} = \begin{bmatrix} X \\ Y \end{bmatrix}$$

The controller 102 may identify variation in the dynamic behavior parameter values of the vehicle 10 using the equations described herein. For example, if the controller 102 determines that there is no change in the yaw rate of the vehicle 10 and there is no change in the lateral acceleration of the vehicle 10, the controller 102 determines the inertia parameter values of the vehicle 10 are static (e.g., representing static behavior). Conversely, if the controller 102 determines a change in yaw rate and/or lateral acceleration of the vehicle 10, the controller 102 determines that inertia parameter values of the vehicle 10 have changes (e.g., representing dynamic behavior).

In some embodiments, the controller 102 may be configure to analyze a relationship between M, b, $I_{zz}$. Assuming the vehicle mass of the vehicle 10 is equally distributed on left and right wheels 22, the controller 102 may approximate the relationship between M, b, $I_{zz}$ as:

$$I_{zz}=Mb(L-b)+MT^2/4$$

The controller 102 may be configured to determine:

$$b=0.5(L-Y/X+\sqrt{(L-Y/X)^2+T^2})$$

and $$M=X/b$$

Where T is the distance between left and right wheels 22. In some embodiments, the controller 102 may monitor the inertia parameter values of the vehicle 10 at real-time. The controller 102 may use the calculated values of M, b, and $I_{zz}$ to monitor changes in inertia parameter values of the vehicle 10.

In some embodiments, the controller 102 may generate a notification indicating changes in one or more of the inertia parameter values. For example, if the controller 102 determines that the location of the center of gravity of the vehicle 10 has changed above a threshold change value, the controller 102 may generate a notification indicating that the location of the center of gravity has changes and indicating the current location of the center of gravity. The controller 102 may output the notification to a display of the vehicle 10 to notify an operator of the vehicle 10. The operator may take corrective action, in response to receiving the notification, in order to prevent a trend of oversteering the vehicle 10. Additionally, or alternatively, the controller 102 may communicate the change in the inertia parameter value (e.g., or values) to an ADAS of the vehicle 10 and/or to an autonomous control system of the vehicle 10. The ADAS and/or the autonomous control system may use the changes inertia parameter value (e.g., or values) to selectively control steering and/or operation of the vehicle 10.

In some embodiments, the controller 102 may communicate the change in the inertia parameter value to the EPS system 108. The EPS system 108 may selectively adjust a steering assist value. The steering assist value indicates an amount of assistance to provide the operator in steering the vehicle 10. The EPS system 108 may increase or decrease the steering assist value based on the change in the inertia parameter value.

In some embodiments, the controller 102 may be configured to calculate at least one vehicle inertia parameter value using the at least one lateral dynamic value. As described, the at least one inertia parameter value may include a vehicle mass value of the vehicle 10, a location of center of gravity along a longitudinal axis of the vehicle 10, a yaw moment of inertia value about a location of a center of gravity of the vehicle of the vehicle 10, other suitable parameter values, or a combination thereof. The at least one lateral dynamic value may include a vehicle yaw rate value (e.g., received from the IMU 110), a vehicle lateral acceleration value (e.g., received from the EPS system 108), other suitable lateral dynamic value, or a combination thereof.

The controller 102 may be configured to determine a difference between the calculated at least one vehicle inertia parameter value and a corresponding baseline vehicle inertia parameter value. For example, the controller 102 may be configured to calculate (e.g., while the vehicle 10 is not in operation or when the vehicle 10 is operating at relatively low vehicle speeds) a base line vehicle mass value, a baseline location of the vehicle center of gravity (e.g., and a location of the center of gravity), a baseline vehicle yaw moment of inertia value, other suitable baseline values, or a combination thereof. In some embodiments, the controller 102 may be provided the baseline inertia parameter value during an initial set-up or from a remote computing device during operation of the vehicle 10.

The controller 102 may compare the difference between the at least one inertia parameter value and the baseline inertia parameter value to a threshold. If the controller 102 determines that the difference between the at least one inertia parameter value and the baseline inertia parameter value is within a range of the threshold (e.g., greater than the threshold for some inertia parameter values and less than the threshold for other inertia parameter values), the controller 102 may selectively control vehicle operations of the vehicle 10. For example, for a vehicle mass value, the controller 102 may determine whether the vehicle mass value is less than the threshold. Additionally, or alternatively, for a center of gravity location value and for a vehicle yaw moment of inertia value about the center of gravity location, the controller 102 may determine whether the inertia parameter value is greater than the threshold. The controller 102 may control vehicle steering, vehicle breaking, autonomous vehicle control operations, vehicle stability control, other suitable vehicle operation, or a combination thereof. The controller 102 may generate and output the notification, as described, and/or may communicate the change in the at least one inertia parameter value to the ADAS and/or the autonomous control system of the vehicle 10.

In some embodiments, the system 100 may perform the methods described herein. However, the methods described herein as performed by system 100 are not meant to be limiting, and any type of software executed on a controller can perform the methods described herein without departing from the scope of this disclosure. For example, a controller, such as a processor executing software within a computing device, can perform the methods described herein.

Figure 4:
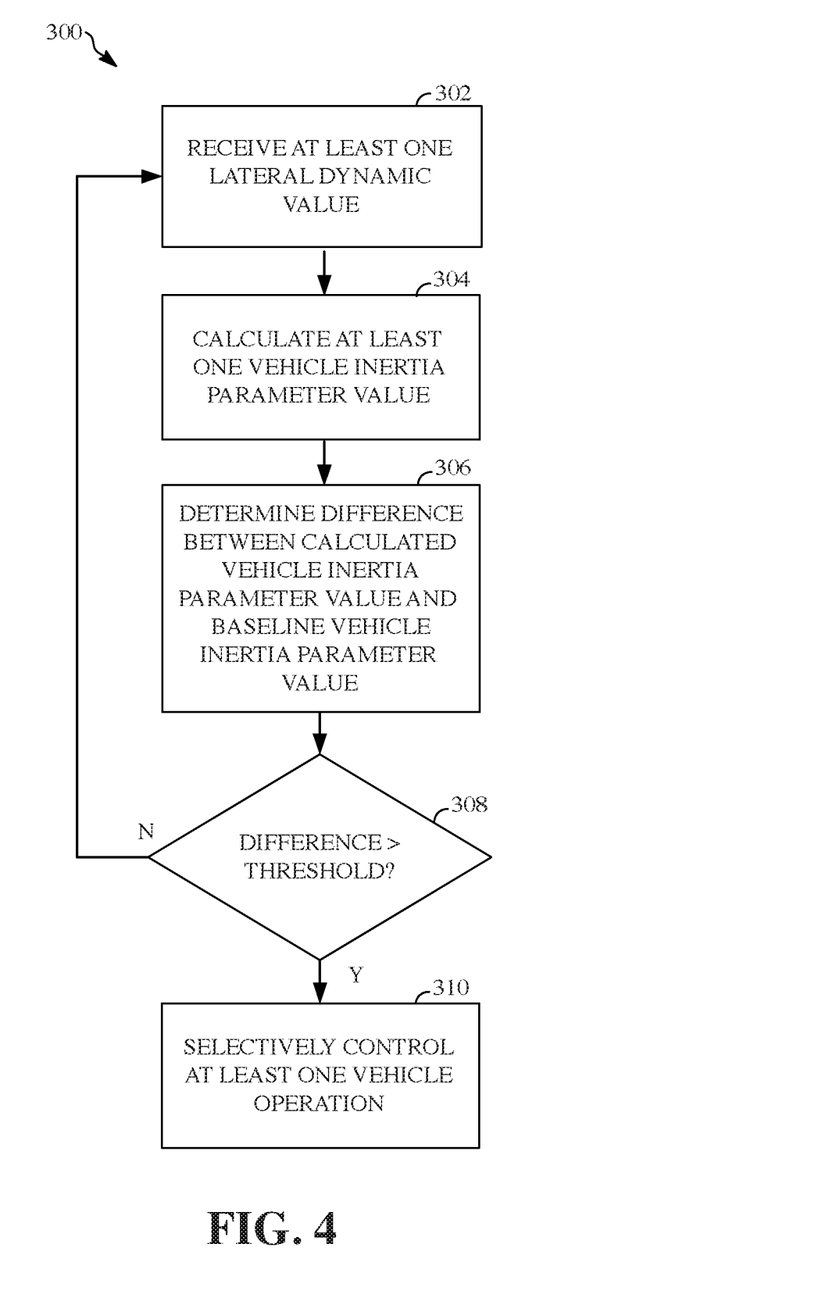
FIG. 4 is a flow diagram generally illustrating a vehicle inertia monitoring method according to the principles of the present disclosure.

FIG. 4 is a flow diagram generally illustrating a vehicle inertia monitoring method 300 according to the principles of the present disclosure. At 302, the method 300 receives at least one lateral dynamic value. For example, the controller 102 receives the at least one lateral dynamic value of the vehicle 10.

At 304, the method 300 calculates at least one vehicle inertia parameter value. For example, the controller 102 calculates at least one of the vehicle mass value, the location of the center of gravity, and the vehicle yaw moment of inertia value.

At 306, the method 300 determines a difference between the calculated vehicle inertia parameter value and a corresponding baseline inertia parameter value. For example, the controller 102 determines the difference between the calculated vehicle inertia parameter value and the corresponding baseline inertia parameter value.

At 308, the method 300 determines whether the difference is greater than a threshold. For example, the controller 102 determines whether the difference is greater than the threshold. If the controller 102 determines that the difference is not greater than the threshold, the method 300 continues at 302. If the controller 102 determines that the difference is greater than the threshold, the method 300 continues at 310.

At 310, the method 300 selectively controls at least one vehicle operation. For example, the controller 102 selectively controls vehicle steering, vehicle breaking, autonomous operation, vehicle stability control, and the like of the vehicle 10, as described.

In some embodiments, a system for monitoring vehicle inertia parameters in real-time includes a processor and a memory. The memory includes instructions that, when executed by the processor, cause the processor to: receive at least one lateral dynamic value; calculate at least one vehicle inertia parameter value using the at least one lateral dynamic value; determine a difference between the calculated at least one vehicle inertia parameter value and a corresponding baseline vehicle inertia parameter value; and based on a determination that the difference between the calculated at least one vehicle inertia parameter value and the corresponding baseline vehicle inertia parameter value is greater than a threshold, selectively control at least one vehicle operation based on the calculated at least one vehicle inertia parameter value.

In some embodiments, the calculated at least one inertia parameter value includes a vehicle mass value. In some embodiments, the calculated at least one inertia parameter value includes a location of a vehicle center of gravity along a longitudinal axis of the vehicle. In some embodiments, the calculated at least one inertia parameter value includes a vehicle yaw moment of inertia value about a location of a center of gravity of the vehicle. In some embodiments, the at least one lateral dynamic value includes a vehicle yaw rate. In some embodiments, the at least one lateral dynamic value includes a vehicle lateral acceleration. In some embodiments, the instructions further cause the processor to selectively control at least one vehicle operation based on the calculated at least one vehicle inertia parameter value by providing an indication representing the calculated at least one inertia parameter value. In some embodiments, the instructions further cause the processor to selectively control at least one vehicle operation based on the calculated at least one vehicle inertia parameter value by adjusting a steering assist value based on the calculated at least one inertia parameter value. In some embodiments, the instructions further cause the processor to selectively control at least one vehicle operation based on the calculated at least one vehicle inertia parameter value by providing the calculated at least one inertia parameter value to an autonomous vehicle controller.

In some embodiments, a method for monitoring vehicle inertia parameters in real-time includes receiving at least one lateral dynamic value. The method also includes calculating at least one vehicle inertia parameter value using the at least one lateral dynamic value. The method also include determining a difference between the calculated at least one vehicle inertia parameter value and a corresponding baseline vehicle inertia parameter value. The method also includes, based on a determination that the difference between the calculated at least one vehicle inertia parameter value and the corresponding baseline vehicle inertia parameter value is greater than a threshold, selectively controlling at least one vehicle operation based on the calculated at least one vehicle inertia parameter value.

In some embodiments, the calculated at least one inertia parameter value includes a vehicle mass value. In some embodiments, the calculated at least one inertia parameter value includes a location of a vehicle center of gravity along a longitudinal axis of the vehicle. In some embodiments, the calculated at least one inertia parameter value includes a vehicle yaw moment of inertia value about a location of a center of gravity of the vehicle. In some embodiments, the at least one lateral dynamic value includes a vehicle yaw rate. In some embodiments, the at least one lateral dynamic value includes a vehicle lateral acceleration. In some embodiments, selectively controlling at least one vehicle operation based on the calculated at least one vehicle inertia parameter value includes providing an indication representing the calculated at least one inertia parameter value. In some embodiments, selectively controlling at least one vehicle operation based on the calculated at least one vehicle inertia parameter value includes adjusting a steering assist value based on the calculated at least one inertia parameter value. In some embodiments, selectively controlling at least one vehicle operation based on the calculated at least one vehicle inertia parameter value includes providing the calculated at least one inertia parameter value to an autonomous vehicle controller.

In some embodiments, an apparatus for monitoring vehicle inertia parameters includes a vehicle controller that includes a processor and a memory. The memory includes instructions that, when executed by the processor, cause the processor to: receive at least one lateral dynamic value; calculate a vehicle mass value using the at least one lateral dynamic value; calculate a location of a vehicle center of gravity along a longitudinal axis of the vehicle using the at least one lateral dynamic value; calculate a vehicle yaw moment of inertia value using the at least one lateral dynamic value; determine a first difference between the calculated vehicle mass value and a corresponding baseline vehicle mass value; determine a second difference between the calculated location of the vehicle center of gravity and a corresponding baseline location of the vehicle center of gravity; determine a third difference between the calculated vehicle yaw moment of inertia value and a corresponding baseline vehicle yaw moment of inertia value; and, based on a determination that at least one of the first difference, the second difference, and the third difference is greater than a corresponding threshold, selectively control at least one vehicle operation based on one or more of the calculated vehicle mass value, the calculated location of the vehicle center of gravity, and the calculated vehicle yaw moment of inertia value.

In some embodiments, the at least one vehicle lateral dynamic value includes at least one of a vehicle yaw rate value and a vehicle lateral acceleration value.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A system for monitoring vehicle inertia parameters in real-time, the system comprising:
a processor; and
a memory that includes instructions that, when executed by the processor, cause the processor to:
receive at least one lateral dynamic value of a vehicle operating at a first vehicle speed;
determine a lateral force corresponding to one of a front axle and a rear axle based on a mechanical trail, a pneumatic trail, and a rack force associated with a steering system of the vehicle, wherein the pneumatic trail is a function of vehicle speed and a slip angle;
calculate at least one vehicle inertia parameter value using the at least one lateral dynamic value and the lateral force;
determine a difference between the calculated at least one vehicle inertia parameter value and a corresponding baseline vehicle inertia parameter value, wherein the corresponding baseline vehicle inertia parameter value includes a value corresponding to at least one aspect of the vehicle while the vehicle is not in operation or while the vehicle is operating at a second vehicle speed that is below a predetermined speed, wherein the first vehicle speed is greater than the second vehicle speed; and
based on a determination that the difference between the calculated at least one vehicle inertia parameter value and the corresponding baseline vehicle inertia parameter value is within a range of a threshold, selectively control at least one vehicle operation based on the calculated at least one vehicle inertia parameter value, wherein the selectively controlling the at least one vehicle operation includes at least selectively increasing or decreasing a steering assist value, the steering assist value corresponding to an amount of torque applied to at least one steering component to assist vehicle steering.

2. The system of claim 1, wherein the calculated at least one inertia parameter value includes a vehicle mass value.

3. The system of claim 1, wherein the calculated at least one inertia parameter value includes a location of a vehicle center of gravity along a longitudinal axis of the vehicle.

4. The system of claim 1, wherein the calculated at least one inertia parameter value includes a vehicle yaw moment of inertia value about a location of a center of gravity of the vehicle.

5. The system of claim 1, wherein the at least one lateral dynamic value includes a vehicle yaw rate.

6. The system of claim 1, wherein the at least one lateral dynamic value includes a vehicle lateral acceleration.

7. The system of claim 1, wherein the instructions further cause the processor to selectively control at least one vehicle operation based on the calculated at least one vehicle inertia parameter value by providing an indication representing the calculated at least one inertia parameter value.

8. The system of claim 1, wherein the instructions further cause the processor to communicate the calculated at least one inertia parameter value to an advanced driver-assistance system.

9. The system of claim 1, wherein the instructions further cause the processor to selectively control at least one vehicle operation based on the calculated at least one vehicle inertia parameter value by providing the calculated at least one inertia parameter value to an autonomous vehicle controller.

10. A method for monitoring vehicle inertia parameters in real-time, the method comprising:
receiving at least one lateral dynamic value of a vehicle operating at a first vehicle speed;
determining a lateral force corresponding to one of a front axle and a rear axle based on a mechanical trail, a pneumatic trail, and a rack force associated with a steering system of the vehicle, wherein the pneumatic trail is a function of vehicle speed and a slip angle;
calculating at least one vehicle inertia parameter value using the at least one lateral dynamic value and the lateral force;
determining a difference between the calculated at least one vehicle inertia parameter value and a corresponding baseline vehicle inertia parameter value, wherein the corresponding baseline vehicle inertia parameter value includes a value corresponding to at least one aspect of the vehicle while the vehicle is not in operation or while the vehicle is operating at a second vehicle speed that is below a predetermined speed, wherein the first vehicle speed is greater than the second vehicle speed; and
based on a determination that the difference between the calculated at least one vehicle inertia parameter value and the corresponding baseline vehicle inertia parameter value is within a range of a threshold, selectively controlling at least one vehicle operation based on the calculated at least one vehicle inertia parameter value, wherein the selectively controlling the at least one vehicle operation includes at least selectively increasing or decreasing a steering assist value, the steering assist value corresponding to an amount of torque applied to at least one steering component to assist vehicle steering.

11. The method of claim 10, wherein the calculated at least one inertia parameter value includes a vehicle mass value.

12. The method of claim 10, wherein the calculated at least one inertia parameter value includes location of a vehicle center of gravity along a longitudinal axis of the vehicle.

13. The method of claim 10, wherein the calculated at least one inertia parameter value includes a vehicle yaw moment of inertia value about a location of a center of gravity of the vehicle.

14. The method of claim 10, wherein the at least one lateral dynamic value includes a vehicle yaw rate.

15. The method of claim 10, wherein the at least one lateral dynamic value includes a vehicle lateral acceleration.

16. The method of claim 10, wherein selectively controlling at least one vehicle operation based on the calculated at least one vehicle inertia parameter value includes providing an indication representing the calculated at least one inertia parameter value.

17. The method of claim 10, further comprising communicating the calculated at least one inertia parameter value to an advanced driver-assistance system.

18. The method of claim 10, wherein selectively controlling at least one vehicle operation based on the calculated at least one vehicle inertia parameter value includes providing the calculated at least one vehicle inertia parameter value to an autonomous vehicle controller.

19. An apparatus for monitoring vehicle inertia parameters, the apparatus comprising:
a vehicle controller that includes:

a processor; and a memory including instructions that, when executed by the processor, cause the processor to:

receive at least one lateral dynamic value of a vehicle operating at a first vehicle speed;

determine a lateral force corresponding to one of a front axle and a rear axle based on a mechanical trail, a pneumatic trail, and a rack force associated with a steering system of the vehicle, wherein the pneumatic trail is a function of vehicle speed and a slip angle;

calculate a vehicle mass value using the at least one lateral dynamic value and the lateral force;

calculate a location of a vehicle center of gravity along a longitudinal axis of the vehicle using the at least one lateral dynamic value;

calculate a vehicle yaw moment of inertia value about a location of a center of gravity of the vehicle using the at least one lateral dynamic value;

determine a first difference between the calculated vehicle mass value and a corresponding baseline vehicle mass value, wherein the corresponding baseline vehicle mass value includes a value corresponding to at least one aspect of the vehicle while the vehicle is not in operation or while the vehicle is operating at a second vehicle speed that is below a predetermined speed, wherein the first vehicle speed is greater than the second vehicle speed;

determine a second difference between the calculated location of the vehicle center of gravity and a corresponding baseline location of the vehicle center of gravity;

determine a third difference between the calculated vehicle yaw moment of inertia value and a corresponding baseline vehicle yaw moment of inertia value; and based on a determination that at least one of the first difference, the second difference, and the third difference is within a range of a corresponding threshold, selectively control at least one vehicle operation based on one or more of the calculated vehicle mass value, the calculated location of a vehicle center of gravity along, and the calculated vehicle yaw moment of inertia value, wherein the selectively controlling the at least one vehicle operation includes at least selectively increasing or decreasing a steering assist value, the steering assist value corresponding to an amount of torque applied to at least one steering component to assist vehicle steering.

20. The apparatus of claim 19, wherein the at least one vehicle lateral dynamic value includes at least one of a vehicle yaw rate value and a vehicle lateral acceleration value.

\* \* \* \* \*